United States Patent [19]

Habib et al.

[11] Patent Number: 5,439,860
[45] Date of Patent: Aug. 8, 1995

[54] CATALYST SYSTEM FOR COMBINED HYDROTREATING AND HYDROCRACKING AND A PROCESS FOR UPGRADING HYDROCARBONACEOUS FEEDSTOCKS

[75] Inventors: Mohammad M. Habib, Benicia; Philip L. Winslow, Hercules; Richard O. Moore, Jr., San Rafael, all of Calif.

[73] Assignee: Chevron Research and Technology Company, a Division of Chevron U.S.A. Inc., San Francisco, Calif.

[21] Appl. No.: 44,359

[22] Filed: Apr. 7, 1993

Related U.S. Application Data

[63] Continuation-in-part of Ser. No. 869,666, Apr. 16, 1992, abandoned.

[51] Int. Cl.$^6$ ............... B01J 29/05; B01J 29/072; B01J 29/068
[52] U.S. Cl. ........................... 502/66; 502/69; 502/79
[58] Field of Search ............... 502/66, 69, 79

[56] References Cited

U.S. PATENT DOCUMENTS

| | | | |
|---|---|---|---|
| 4,515,903 | 5/1985 | Otterstedt et al. | 502/69 |
| 4,789,654 | 12/1988 | Hirano et al. | 502/66 |
| 4,923,592 | 5/1990 | Abdo | 502/66 |
| 4,929,338 | 5/1990 | Wormsbecher | 502/69 |
| 4,950,383 | 8/1990 | Tait et al. | 502/66 |
| 4,957,892 | 9/1990 | Yoo et al. | 502/69 |
| 5,071,805 | 12/1991 | Winslow et al. | 502/69 |
| 5,187,133 | 2/1993 | Yoshinari et al. | 502/66 |

*Primary Examiner*—Asok Pal
*Attorney, Agent, or Firm*—V. J. Cavalieri

[57] ABSTRACT

A physically intermixed catalyst system comprising two distinctly different catalytic particles, the first of which is a hydrodenitrification and/or hydrodesulfurization catalyst and the second of which is a relatively active hydrocracking catalyst, wherein the catalyst particles of both catalytic components are substantially the same size, that is the effective diameter of each catalyst component is substantially the same. The catalyst system of the present invention can be layered with unmixed catalysts. The novel systems of the present invention have been found to provide surprisingly good selectivity for liquid products and stability against catalyst fouling when used in combined hydrotreating and hydrocracking applications, and can therefore be used to provide a stable catalyst system which offers even heat distribution and reactor control in such applications.

14 Claims, No Drawings

CATALYST SYSTEM FOR COMBINED HYDROTREATING AND HYDROCRACKING AND A PROCESS FOR UPGRADING HYDROCARBONACEOUS FEEDSTOCKS

RELATED APPLICATIONS

This application is a continuation-in-part of U.S. Ser. No. 869,666 filed Apr. 16, 1992 and now abandoned, which is incorporated totally herein by reference.

BACKGROUND OF THE INVENTION

FIELD OF THE INVENTION

The present invention relates to a catalyst system and a process for combined hydrotreating and hydrocracking operations in a single reactor bed by contacting a hydrocarbonaceous feedstock with hydrogen under hydrocracking conditions in the presence of an appropriate dual function catalyst system. In particular, the catalyst system and process of this invention relate to a combined denitrification and/or desulfurization hydrotreating process and a hydrocracking process wherein the catalyst system exhibits surprising stability and high selectivity for liquid products boiling in the transportation fuels range. The catalyst system can be tailored to provide previously unavailable flexibility with regard to the selection of the hydrocracking catalyst.

The dual function catalyst system of the present invention comprises two randomly intermixed particulate catalysts having distinctly different catalytic functions. The first catalyst is a conventional hydrodenitrification and/or hydrodesulfurization catalyst having substantially no cracking activity. The second catalyst is a conventional zeolitic hydrocracking catalyst. Both catalysts are selected so that they are substantially the same size, that is, the effective diameter for each catalyst particle is substantially the same.

The novel catalyst systems of the present invention have been found to provide surprisingly good selectivity for liquid products and stability against catalyst fouling when used in combined hydrotreating and hydrocracking applications, and can therefore be used to provide a stable catalyst system which offers even heat distribution and reactor control in such applications.

OBJECTS OF THE INVENTION

Of the many hydroconversion processes known to the petroleum refining industry, catalytic hydrotreating and catalytic hydrocracking are perhaps the two most widely applied and important. In conventional refining practice, hydrotreating is carried out using a catalyst(s) having as the principle function the removal of nitrogen and/or sulfur, that is catalytic hydrodenitrification and hydrodesulfurization. The product of hydrotreating is then fed to a hydrocracking process unit which uses catalysts having as the principle function hydroconversion to produce liquid products boiling in the transportation fuels range.

Hydrotreating the feedstock to a hydrocracking process unit is particularly important as nitrogen and sulfur are known to contaminate conventional hydrocracking process catalysts.

Thus, hydrotreating is used to lower the nitrogen and sulfur content of the hydrocarbonaceous feedstock stream to an acceptable level before subjecting the hydrocarbons to the complete hydrocracking process. In general, it is desirable to lower the nitrogen content of the hydrocarbon feedstock stream to less than 50 parts per million by weight (ppm), preferably less than about 10 ppm and in many cases for increased catalyst life to a level of less than 2 ppm or even as low as about 0.1 ppm. Similarly, it is generally desirable to lower the sulfur content of the hydrocarbon feedstock stream to less than about 0.5% by weight percent, preferably less than about 0.1%, and in many cases as low as about 1 ppm.

However, hydrotreating catalysts have various disadvantages. Perhaps the most noted disadvantage is the tendency to foul with coke or other contaminants at an excessive rate. This results in shorter catalyst life than is desirable. As the catalyst fouls or deactivates, the denitrification process temperature must be increased to maintain activity. When the maximum temperature allowed by process and equipment limitations is reached, the catalyst must be replaced or regenerated.

A variety of measures have been suggested to overcome the problems of catalyst deactivation in hydrotreating systems. For example, U.S. Pat. No. 4,990,243 issued Feb. 5, 1991 to Winslow describes a layered catalyst system for hydrodenitrification. The idea behind layered systems is to provide a catalyst system which permits the operator to control the process conditions such as temperature to allow more uniform operations while removing contaminants such as nitrogen. In particular, the layered systems utilize discrete catalyst layers with differing catalysts having differing activity for denitrification and cracking. The first layer is a more active denitrification catalyst which does not induce cracking reactions. The second layer is more acidic and has higher cracking activity which results in effective conversion of the refractory nitrogen compounds not converted in the first layer.

U.S. Pat. No. 4,534,852 issued on Aug. 13, 1985 to Washecheck et al. describes a single stage hydrotreating process for converting pitch to conversion process feedstock. According to this process the pitch containing feedstock is contacted with hydrogen and passed downwardly through a hydrotreating zone over a stacked-bed catalyst. The upper bed contains a high activity hydrotreating catalyst, and a separate lower bed contains a high activity desulfurization catalyst. The reaction product is a suitable hydrocracking feedstock.

U.S. Pat. No. 3,923,638 issued on Dec. 2, 1975 to Bertolacini et al. describes a two-catalyst hydrocracking process. In this process a nitrogen containing feedstock is denitrified in a pretreatment zone using a hydrodenitrification catalyst. The denitrified effluent is passed to a hydrocracking zone. The process can be carried out in a single stage.

As noted previously the product from hydrotreating can be fed to a hydrocracking process unit. Modern hydrocracking catalysts are generally based on zeolitic materials which may have been adapted by techniques like ammonia ion exchange and various forms of calcination in order to improve the performance of the hydrocracking catalysts based on such zeolites. In nearly all cases, hydrocracking catalysts are formulated to provide varying degrees of cracking activity depending upon the desired product slate. Thus, hydrocracking catalysts which have high activity, and therefore promote the exothermic cracking reactions, may not be suitable for all applications.

Accordingly, the general approach of catalyst manufacturers has been to offer a family of catalysts tailored in activity for various applications. In other words, operating flexibility is achieved by selecting from a variety of available catalysts the one catalyst which is most suitable for the specific application at hand. However, this solution has created another difficulty. Refiners have found that on occasion the product slate changes which they wish to make are not possible if the choice of available hydrocracking catalysts in inventory does not include the particular catalyst with the activity required to produce the new product slate.

Thus, it would be desirable to provide a stable hydrotreating catalyst system with high denitrification and/or desulfurization activity which could be used to produce a low nitrogen low sulfur feedstock to a hydrocracking process. It would also be desirable to provide a flexible hydrocracking catalyst system which had high selectivity for liquid products.

It would be even more desirable to provide a stable catalyst system which could be used to simultaneously carry out combined hydrotreating and hydrocracking to selectively produce liquid products in the transportation fuels boiling range.

Several attempts have been made to provide dual function combined hydrotreating and hydrocracking processes and catalyst systems.

U.S. Pat. No. 4,797,196 issued on Jan. 10, 1989 to Kukes et al. describes a hydrocracking process having intermixed catalysts. In this process, each of the intermixed catalysts has hydrodenitrification and/or hydrodesulfurization activity as well as cracking activity, that is they both have zeolitic components and function to crack the feedstock. Thus, although one of the catalysts is predominantly a hydrotreating catalyst, each catalytic particle is dual functional.

U.S. Pat. No. 4,210,521 issued on Jul. 1, 1980 to Gorring et al. also describes a dual bed catalytic upgrading process for refractory hydrocarbon stocks. In this process, the refractory feedstock is first catalytically hydrotreated and the hydrotreated product is subsequently cascaded through a hydrocracking zone. The initial hydrotreating step serves to convert sulfur and nitrogen derivatives of hydrocarbons to hydrogen sulfide and ammonia while depositing metal contaminants.

U.S. Pat. No. 4,363,719 issued on Dec. 14, 1982 to Bousquet et al. describes a process to improve the stability of a catalyst to be used for lowering the cloud or turbidity point and the filterability limit temperature of gas-oils. The catalyst is a composite of a non-acidic hydrodesulfurization catalyst and a non-zeolitic silica-alumina based hydroconversion catalyst.

It is the principal object of the present invention to provide a stable catalyst system for combined hydrotreating and hydrocracking process operations with high selectivity for liquid products in the transportation fuels boiling range. This and other objectives are accomplished by the catalyst system and process summarized below.

SUMMARY OF THE INVENTION

In accordance with the present invention, a stable catalyst system and a combined process for hydrotreating and hydrocracking is provided. The catalyst system takes advantage of the discovery that it is possible to intermix a hydrotreating catalyst having substantially no cracking activity with a zeolitic hydrocracking catalyst where the catalysts are substantially the same size to provide a catalyst system which can be used to carry out combined hydrotreating and hydrocracking process operations. The novel systems provide high selectivity and catalytic flexibility under typical hydrocracking conditions.

The foregoing catalyst system can be used to carry out combined hydrotreating and hydrocracking processes under typical hydrocracking process conditions.

DETAILED DESCRIPTION OF THE INVENTION

Those familiar with the art related to the present invention will appreciate the full scope of the catalyst system and the process summarized above and be able to practice the present invention over its full scope from a detailed description of the principal features of the catalyst system and process which follows.

The Catalyst System

The dual function catalyst system of the present invention comprises a randomly intermixed combination of at least two discrete particulate catalysts. The first catalyst is a conventional hydrotreating catalyst of the type used to carry out hydrodenitrification and/or hydrodesulfurization reactions having substantially no cracking activity. Those familiar with the art recognize that such catalysts generally are constituted by a metal from Group VI and a metal from Group VIII placed on a non-acidic oxide such as pure alumina. The commercial catalysts generally fall into one or more of the numerous nickel-molybdenum or cobalt-molybdenum, or nickel-tungsten, or cobalt-tungsten families. The catalytic metals are supported by alumina or other low acidic support material. Such catalysts to be useful in the present invention do not have cracking activity, that is they are non-zeolitic non-acidic catalysts which function to promote hydrodenitrification and/or hydrodesulfurization reactions. Such catalysts are well known in the art.

The second catalyst particle is a conventional zeolitic hydrocracking catalyst of the type used to carry out hydroconversion reactions to produce transportation fuels. Those familiar with the art recognize that such catalysts are generally based on zeolitic materials which may have been adapted by techniques like ammonia ion exchange and various forms of calcination. In general, suitable zeolitic hydrocracking catalysts comprise a hydrogenation component such as a metal from Group VIB and a metal from Group VIII, their oxides, their sulfide, and mixtures thereof and an acidic support of large pore crystalline zeolitic aluminosilicate.

One of the zeolites which is considered to be a good starting material for the manufacture of hydrocracking catalysts is the well-known synthetic zeolite Y as described in U.S. Pat. No. 3,130,007 issued Apr. 21, 1964. A number of modifications to this material have been reported one of which is ultrastable Y zeolite as described in U.S. Pat. No. 3,536,605 issued Oct. 27, 1970. To further enhance the utility of synthetic Y zeolite additional components can be added. For example, U.S. Pat. No. 3,835,027 issued on Sep. 10, 1974 to Ward et al. describes a hydrocracking catalysts containing at least one amorphous refractory oxide, a crystalline zeolitic aluminosilicate and a hydrogenation component selected from the Group VI and Group VIII metals and their sulfides and their oxides.

It has been found that if the two particulate catalysts are selected so that the effective diameter is substantially the same for both the hydrotreating and the hydrocracking catalyst particles it is possible to intermix the two catalysts to provide a system which surprisingly has the beneficial attributes of both hydrotreating and hydrocracking. This is particularly surprising since it is known that conventional hydrotreating catalysts are rapidly fouled by coke buildup, and that conventional zeolitic catalysts catalyze cracking reactions which may cause a heat increase leading to coke formation at the edges of the zeolite particle.

As used herein, the term "intermixed" means that no effort is made to layer or otherwise segregate the individual hydrotreating catalyst particles from the individual hydrocracking catalyst particles. Thus, the hydrotreating catalyst particles and the hydrocracking catalyst particles are allowed to physically associate with each other in a relatively random manner to form a heterogeneous physical mixture. This can be accomplished prior to or during catalyst loading.

In order to provide a catalyst system with intermixed hydrotreating and hydrocracking particles which is stable and acceptable for use under conventional hydrocracking conditions, it has been found that the particle size of each of the catalytic particles must be substantially the same. Although there are a number of catalyst sizing conventions, such as surface to volume ratio, length over diameter ratio, diameter of the circumscribed circle, etc., when comparing catalysts which may have nonuniform shape we have chosen to use the effective diameter of a particle as representative of its size. As used herein the term "effective diameter" for a catalyst particle with a circular cross section means the diameter of that cross section, and for a catalyst particle with a non-circular cross section means the average of the major and minor axes. The important aspect of this parameter is not so much the absolute size of the particles, but rather the relative size of the hydrotreating catalyst particles to the size of the hydrocracking catalyst particles. It is the central feature of the present invention that for the two intermixed catalysts to form the catalyst system of this invention the effective diameter of each must be substantially the same. By "substantially the same" is meant within a factor of about 4 of each other, preferably within a factor of about 2 of each other, and even more preferably within a factor of about 1.5 of each other.

Therefore, it is not intended that the present invention should be limited by the specific size of the catalysts in question, but rather that the present invention is defined by the relative size of the particles of the two catalysts.

It is a principal advantage of the present invention that since two conventional catalysts are randomly intermixed to form the catalyst system, it is possible to select a hydrocracking catalyst which under typical conditions would be too active, that is, its heat release would be too great for the equipment available, and to reduce that heat release to within acceptable limitations by combining it with a select hydrotreating catalyst in proportions which give the desired activity. Those familiar with the art will recognize that there are an endless variety of such combinations. In general, the ratio of hydrotreating to hydrocracking catalyst will be within the range of from about 1:20 to about 20:1, preferably within the range of from about 1:10 to about 10:1, more preferably within the range of from about 1:5 to about 5:1.

One such combination which has been found to be particularly effective uses a conventional commercially available nickel-molybdenum hydrotreating catalyst comprising about 3.1 weight percent nickel and about 16 weight percent molybdenum with the balance being phosphorous and alumina; and a hydrocracking catalyst which is a comulled zeolitic catalyst comprising about 17 weight percent alumina binder, about 12 weight percent molybdenum, about 4 weight percent nickel, about 30 weight percent Y-zeolite, and about 30 weight percent amorphous silica/alumina. This hydrocracking catalyst is generally described in U.S. patent application Ser. No. 870,011, filed by M. M. Habib et al. on Apr. 15, 1992 and now abandoned, the full disclosure of which is hereby incorporated by reference. This more general hydrocracking catalyst comprises a Y zeolite having a unit cell size greater than about 24.55 Angstroms and a crystal size less than about 2.8 microns together with an amorphous cracking component, a binder, and at least one hydrogenation component selected from the group consisting of a Group VI metal and/or Group VIII metal and mixtures thereof.

In preparing a Y zeolite for use in accordance with the invention herein, the process as disclosed in U.S. Pat. No. 3,808,326 should be followed to produce a Y zeolite having a crystal size less than about 2.8 microns.

More specifically, the hydrocracking catalyst suitably comprises from about 30%–90% by weight of Y zeolite and amorphous cracking component, and from about 70%–10% by weight of binder. Preferably, the catalyst comprises rather high amounts of Y zeolite and amorphous cracking component, that is, from about 60%–90% by weight of Y zeolite and amorphous cracking component, and from about 40%–10% by weight of binder, and being particularly preferred from about 80%–85% by weight of Y zeolite and amorphous cracking component, and from about 20%–15% by weight of binder. Preference is given to the use of silica-alumina as the amorphous cracking component.

The amount of Y zeolite in the catalyst ranges from about 5–70% by weight of the combined amount of zeolite and cracking component. Preferably, the amount of Y zeolite in the catalyst compositions ranges from about 10%–60% by weight of the combined amount of zeolite and cracking component, and most preferably the amount of Y zeolite in the catalyst compositions ranges from about 15–40% by weight of the combined amount of zeolite and cracking component.

Depending on the desired unit cell size, the $SiO_2/Al_2O_3$ molar ratio of the Y zeolite may have to be adjusted. There are many techniques described in the art which can be applied to adjust the unit cell size accordingly. It has been found that Y zeolites having a $SiO_2/Al_2O_3$ molar ratio from about 3 to about 30 can be suitably applied as the zeolite component of the catalyst compositions according to the present invention. Preference is given to Y zeolites having a molar $SiO_2/Al_2O_3$ ratio from about 4 to about 12, and most preferably having a molar $SiO_2/Al_2O_3$ ratio from about 5 to about 8.

The amount of cracking component such as silica-alumina in the hydrocracking catalyst ranges from about 10%–50% by weight, preferably from about 25%–35% by weight. The amount of silica in the silica-alumina ranges from about 10%–70% by weight. Preferably, the amount of silica in the silica-alumina ranges from about 20%–60% by weight, and most preferably the amount of silica in the silica-alumina ranges from about 25%–50% by weight. Also, so-called X-ray amorphous zeolites (i.e., zeolites having crystallite sizes too small to be detected by standard X-ray techniques)

can be suitably applied as cracking components according to the process embodiment of the present invention.

The binder(s) present in the hydrocracking catalyst suitably comprise inorganic oxides. Both amorphous and crystalline binders can be applied. Examples of suitable binders comprise silica, alumina, clays and zirconia. Preference is given to the use of alumina as binder.

The amount(s) of hydrogenation component(s) in the catalyst suitably range from about 0.5% to about 10% by weight of Group VIII metal component(s) and from about 5% to about 25% by weight of Group VI metal component(s), calculated as metal(s) per 100 parts by weight of total catalyst. The hydrogenation components in the catalyst may be in the oxidic and/or the sulphidic form. If a combination of at least a Group VI and a Group VIII metal component is present as (mixed) oxides, it will be subjected to a sulphiding treatment prior to proper use in hydrocracking.

Suitably, the catalyst comprises one or more components of nickel and/or cobalt and one or more components of molybdenum and/or tungsten or one or more components of platinum and/or palladium.

The hydrocracking catalyst comprises from about 3%-10% by weight of nickel and from about 5%-20% by weight molybdenum. Preferably, the catalyst comprises from about 4%-8% by weight of nickel and from about 8%-15% by weight molybdenum, calculated as metals per 100 parts by weight of total catalyst.

The effective diameter of the hydrotreating catalyst particles was about 0.1 inch, and the effective diameter of the hydrocracking catalyst particles was also about 0.1 inch. The two catalysts are intermixed in a weight ratio of about 1.5:1 hydrotreating to hydrocracking catalyst.

The catalyst system of the present invention can be used in a variety of configurations. For example, the dual function system of this invention can be layered with unmixed hydrotreating and/or hydrocracking catalysts. In a preferred configuration a single reactor may contain up to four beds, up to about 60% by volume of the first bed being unmixed hydrotreating catalyst, from about 10% by volume of the second bed being the catalyst system of the present invention, up to about 50% by volume of the third bed being unmixed hydrocracking catalyst, and up to about 40% by volume of the fourth bed being unmixed hydrotreating catalyst.

Having described in detail the catalyst system which is used in the process of the present invention, it is appropriate to consider the second aspect of the present process.

Process Conditions

The process of the present invention is a combined hydrotreating and hydrocracking process which comprises contacting a hydrocarbonaceous feedstock with hydrogen under typical hydrocracking conditions in the presence of the dual function catalyst system detailed above.

Representative feedstocks include petroleum crude oils, topped or reduced crude oils, solvent deasphalted oils, distillates, etc. Preferred feedstocks include crude petroleum and atmospheric and vacuum towered bottoms. These feedstocks generally have boiling-range above about 200° F. and generally have a boiling range between 350° F. and about 1050° F. More specifically these feedstocks include heavy distillates, heavy straight run gas oils and heavy cracked cycle oils, as well as fluidized catalytic cracking unit feedstocks.

The hydrocarbonaceous feedstock is contacted with hydrogen in the presence of the catalyst system under upgrading conditions which generally include a temperature in the range of from about 500° F. to about 900° F., preferably between about 650° F. and about 850° F.; a pressure of from about 500 pounds per square inch absolute (psia) to about 3,500 psia, preferably from about 1,000 psia to about 3,000 psia; and a liquid hourly space velocity (LHSV) of from about 0.1 to about 6.0, preferably from about 0.5 to about 4; and an oil to gas ratio of from about 2,000 standard cubic feet per barrel (scf/bbl) to about 10,000 scf/bbl, preferably from about 3,000 scf/bbl to about 6,000 scf/bbl.

With the preferred catalyst system described above it has been found that preferred process conditions include contacting a hydrocarbonaceous feedstock with hydrogen in the presence of the physically intermixed catalyst system under hydrocracking conditions comprising a pressure of about 2,300 psia, a gas to oil ratio at from about 4,000 scf/bbl to about 5,000 scf/bbl, a LHSV of about 1.0, and a temperature in the range of from about 680° F. to about 800° F.

These and other specific applications of the catalyst system and process of the present invention are illustrated in the following example.

EXAMPLE

The following Example illustrates the efficacy of the present invention.

A dual catalyst system was prepared by physically intermixing a commercially available nickel-molybdenum hydrotreating catalyst comprising about 3.1 weight percent nickel and about 16 weight percent molybdenum with the balance being phosphorous and alumina; and a zeolitic hydrocracking catalyst which is a comulled zeolitic catalyst comprising about 17 weight percent alumina binder, about 12 weight percent molybdenum, about 4 weight percent nickel, about 30 weight percent Y-zeolite, and about 30 weight percent amorphous silica/alumina. This hydrocracking catalyst was prepared according to the method generally described in application U.S. Ser. No. 870,011 filed by M. M. Habib et al. on Apr. 15, 1992 and now abandoned. This hydrocracking catalyst was prepared by the multi-step process wherein Solution "A" was prepared by dissolving 160.6 g nickel nitrate hexa hydrate [Ni(NO$_3$)$_2$6H$_2$)O] in 70 cc deionized water and then adding about 25 g concentrated nitric acid (70% HNO$_3$).

Solution "B" was a molybdenum solution prepared by stirring and filtering a mixture composed of 26.5 weight percent concentrated aqueous NH$_4$OH, 28.9 weight percent MoO$_3$, balance deionized water.

A solid mixture was prepared by mixing 174.7 grams alumina powder, 293.8 grams SiO$_2$/Al$_2$O$_3$ powder, and 303.8 grams ultra stable Y zeolite powder in a sigma-blade mixer for 5 minutes at about 150° F. mixer jacket temperature. To the solid mixture was then added about 150 cc of deionized water, and the mixture mixed an additional 5 minutes. Solution "A" was then added to the wet solid mixture, and the mixing was continued for an additional 35 minutes.

483.1 grams of Solution "B" were then dripped into the wet solid mixture over a 5-minute period. 70 cc deionized water were added, and the wet solid mixture was mixed for an additional 15 minutes.

The wet mixture was extruded in a 2-inch Bonnot extruder. The extrudates were dried in a preheated oven at 320° F. for 1 hour. They were then heated to 950° F. at 288° F./hr in 10 com dry air, held for 1 hour at 950° F., and then cooled to room temperature.

The effective diameter of the hydrotreating catalyst particles was about 0.1 inch, and the effective diameter of the hydrocracking catalyst particles was also about 0.1 inch. The two catalysts are intermixed in a weight ratio of about 1.5:1 hydrotreating to hydrocracking catalyst.

A feedstock of heavy gas oil having the following characteristics was contacted with above dual catalyst system in the presence of hydrogen:
API Gravity—21.0
Nitrogen—2520 ppm
Sulfur—0.8 weight percent
D2887 Simulated Distillation
  St—380° F.
  10 50%—742° F.
  EP—952° F.

The process conditions were maintained as follows:
1.0 LHSV
2,300 psig total pressure
5,500 scf/bbl gas rate
680° F.-800° F. temperature range At a target product composition of 1.0 ppm nitrogen and 10 ppm sulfur, the dual catalyst system resulted in a 17° F. higher activity and 80% improvement in catalyst life relative to a conventional layered catalyst system comprising 60 volume percent of a commercial zeolitic catalyst and 40 volume percent of a commercial nonzeolitic silica/alumina catalyst.

There are numerous variations on the present invention which are possible in light of the teachings and example supporting the present invention. It is therefore understood that within the scope of the following claims, the invention may be practiced otherwise than as specifically described or exemplified herein.

What is claimed is:

1. A dual function catalyst system for combined hydrotreating and hydrocracking process operations comprising two randomly intermixed distinctly different particulate catalysts, the first of which is a hydrodenitrification and/or hydrodesulfurization catalyst having substantially no cracking activity and the second of which is a hydrocracking catalyst, wherein the catalyst particles of both particulate catalysts are substantially the same size, having an effective diameter within a factor of about 4 of each other.

2. A catalyst system according to claim 1, wherein the particulate hydrotreating catalyst comprises a catalyst selected from the group consisting of nickel-molybdenum, cobalt-molybdenum, nickel-tungsten and cobalt-tungsten.

3. A catalyst system according to claim 1, wherein the particulate hydrotreating catalyst comprises nickel-molybdenum.

4. A catalyst system according to claim 3, wherein the hydrotreating catalyst comprises about 3.1 weight percent nickel and about 16 weight percent molybdenum and the balance is phosphorous and alumina.

5. A catalyst system according to claim 1, wherein the hydrocracking catalyst comprises a Y-zeolite.

6. A catalyst system according to claim 5, wherein the hydrocracking catalyst comprises a Y zeolite having a unit cell size greater than about 24.55 Angstroms and a crystal size less than about 2.8 microns together with an amorphous cracking component, a binder, and at least one hydrogenation component selected from the group consisting of a Group VI metal, and/or a Group VIII metal and mixtures thereof.

7. A catalyst system according to claim 6, wherein the hydrocracking catalyst is a comulled zeolitic catalyst comprising about 17 weight percent alumina binder, about 12 weight percent molybdenum, about 4 weight percent nickel, about 30 weight percent Y-zeolite, and about 30 weight percent amorphous silica/alumina.

8. A catalyst system according to claim 7, wherein the hydrotreating catalyst comprises about 3.1 weight percent nickel and about 16 weight percent molybdenum and the balance is phosphorous and alumina.

9. A catalyst system according to claim 1, wherein the hydrotreating catalyst and hydrocracking catalyst have an effective diameter within a factor of about 2 of each other.

10. A catalyst system according to claim 1, wherein the weight ratio of the hydrotreating catalyst to the hydrocracking catalyst is from about 20:1 to about 1:20.

11. A catalyst system according to claim 1, wherein the weight ratio of the hydrotreating catalyst to the hydrocracking catalyst is from about 10:1 to about 1:10.

12. A catalyst system according to claim 1, wherein the weight ratio of the hydrotreating catalyst to the hydrocracking catalyst is from about 5:1 to about 1:5.

13. A catalyst system according to claim 1, wherein the system is layered with an unmixed hydrotreating catalyst.

14. A catalyst system according to claim 1, wherein the system is layered with an unmixed hydrocracking catalyst.

* * * * *